(12) United States Patent
Suessner et al.

(10) Patent No.: US 8,314,990 B2
(45) Date of Patent: Nov. 20, 2012

(54) FILM HAVING A REFLECTIVE LAYER WITH AT LEAST ONE PIGMENTED LAKE LAYER, PROCESS FOR THE PRODUCTION THEREOF AND USE

(75) Inventors: Hubert Suessner, Oberasbach (DE); Mathias Thaeter, Schwabach/Forsthof (DE)

(73) Assignees: Leonhard Kurz Stiftung & Co., Furth (DE); Erich Utsch AG, Siegen (DE)

( * ) Notice: Subject to any disclaimer, the term of this patent is extended or adjusted under 35 U.S.C. 154(b) by 676 days.

(21) Appl. No.: 12/462,476

(22) Filed: Aug. 4, 2009

(65) Prior Publication Data

US 2010/0033823 A1 Feb. 11, 2010

(30) Foreign Application Priority Data

Aug. 6, 2008 (DE) .......................... 10 2008 036 670

(51) Int. Cl.
*G02B 5/18* (2006.01)

(52) U.S. Cl. ............. 359/573; 359/567; 40/201; 40/208

(58) Field of Classification Search .................. None
See application file for complete search history.

(56) References Cited

U.S. PATENT DOCUMENTS

| 5,200,253 | A | * | 4/1993 | Yamaguchi et al. | ....... 428/195.1 |
| 5,260,165 | A | | 11/1993 | Satou et al. | |
| 5,665,475 | A | * | 9/1997 | Sussner | ...................... 428/32.79 |
| 5,830,609 | A | * | 11/1998 | Warner et al. | ................... 430/10 |
| 6,214,443 | B1 | * | 4/2001 | Palmasi et al. | ................ 428/203 |
| 7,479,320 | B2 | | 1/2009 | Keller et al. | |
| 8,158,252 | B2 | * | 4/2012 | Sussner et al. | ................ 428/343 |
| 2007/0165182 | A1 | | 7/2007 | Hoffmuller et al. | |
| 2009/0141355 | A1 | * | 6/2009 | Thomas et al. | ................ 359/576 |

FOREIGN PATENT DOCUMENTS

| DE | 10226116 | 7/2003 |
| DE | 10241803 A1 | 3/2004 |
| EP | 0461475 | 12/1991 |
| EP | 1482013 | 7/2007 |
| GB | 2093404 | 9/1982 |
| JP | 2001293982 | 10/2001 |
| WO | WO2006018171 | 2/2006 |

* cited by examiner

*Primary Examiner* — Arnel C Lavarias

(74) *Attorney, Agent, or Firm* — Hoffmann & Baron, LLP

(57) ABSTRACT

A film (1) which includes at least one transparent replicating layer (2) having a diffractive relief structure (3) and a reflective layer, the reflective layer being formed by at least one pigmented lake layer (4), and the film (1, 1', 1") showing a latent optically variable effect produced by the diffractive relief structure (3), and the use thereof. Further a method for the production of such a film.

21 Claims, 4 Drawing Sheets

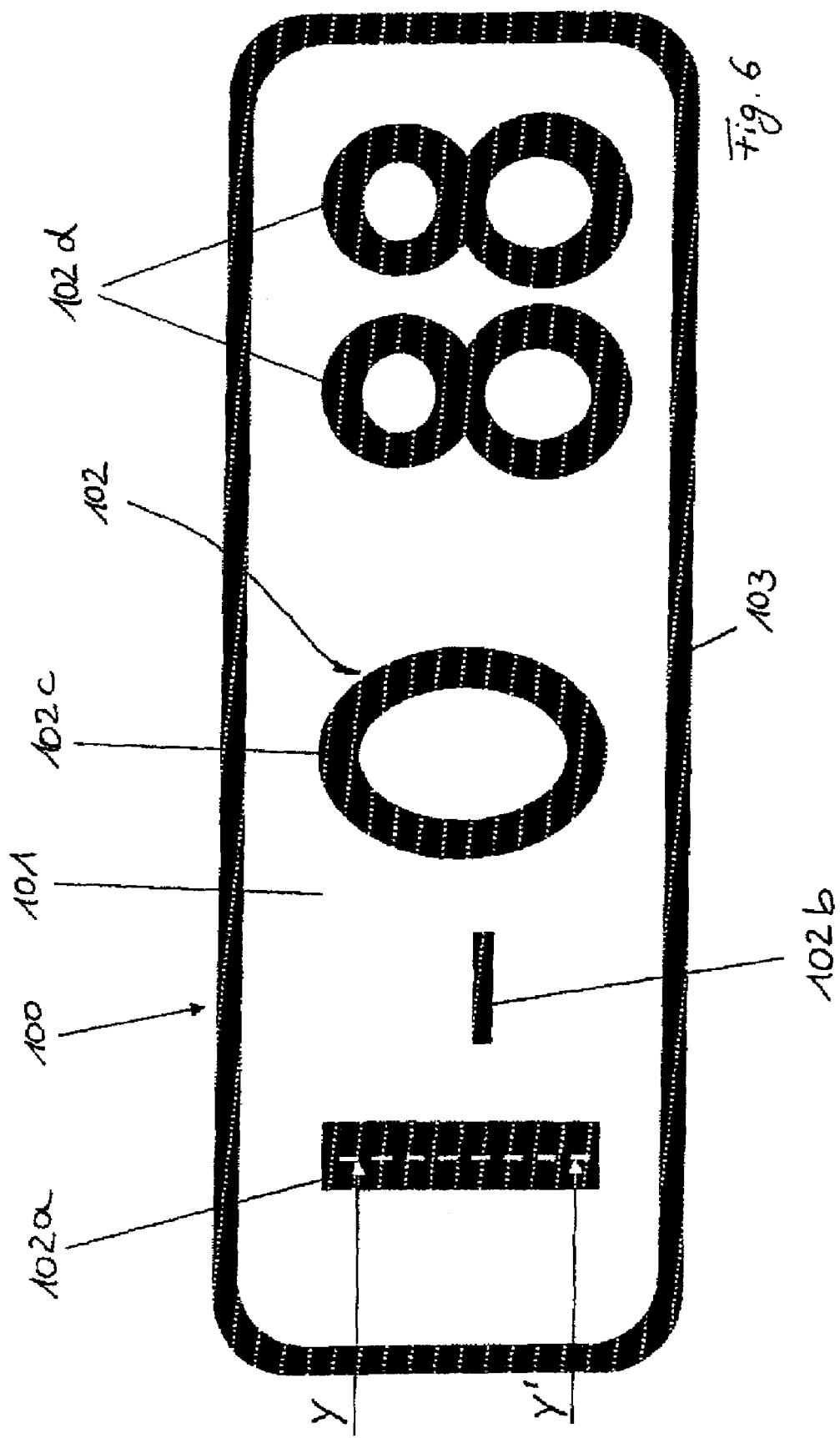

FILM HAVING A REFLECTIVE LAYER WITH AT LEAST ONE PIGMENTED LAKE LAYER, PROCESS FOR THE PRODUCTION THEREOF AND USE

BACKGROUND OF THE INVENTION

The invention relates to a film which comprises at least one transparent replicating layer having a diffractive relief structure and a reflective layer, a method for the production of such a film and a use of the film.

Films of the type mentioned at the outset are known and are used for securing and decorating articles, documents, packagings and the like. Metallic or nonmetallic inorganic reflective layers are used in order optimally to accentuate an optically variable effect produced by the diffractive relief structure. Such an optically variable effect manifests itself in that an observer perceives different appearances of the film at different viewing angles, such as different color impressions and/or image motifs and/or characters and/or dullness. Inter alia, holograms, holographic displays with kinematic effects and the like are recognizable.

For specific fields of use, the known films have proved to be not very suitable since the optically variable effects produced are too striking, are too strongly reflective and/or irritate the human eye. This is the case, for example, with components in the interior of a motor vehicle which are present in the direct field of view of the driver, in the case of motor vehicle number plates or the case of pieces of furniture, packagings, certain valuable documents and the like.

For these applications, films which have other security features or decorative elements are therefore relied upon.

An example of use in the area of motor vehicle number plates, which however is substantially also applicable to the other abovementioned applications, is described in more detail below by way of illustration.

Motor vehicle number plates consist as a rule of a support plate, which usually consists of an aluminum or steel sheet. A raised character legend is embossed in the support plate by means of a mechanical embossing process. The character legend usually consists of alphanumeric characters, which, for example in Germany, indicate the place of registration of the motor vehicle, and form an individual number. In order to make the character legend of the embossed motor vehicle number plate readily visible, the raised embossed areas are provided with a colored coating. A corresponding ink transfer by means of a blocking film which consists of a substrate film which is bonded to a colored decorative layer detachable therefrom is usually carried out for this purpose. During the ink transfer, the substrate film is brought into mechanical contact with the raised embossed areas of the motor vehicle number plate and the decorative layer is transferred thereto under pressure, optionally also under pressure and at elevated temperature.

In order to increase the recognizability of the character legend, the support plate is generally laminated over the whole area with a retroreflective film formed in a contrasting color to the character legend. In the case of the motor vehicle number plates usual in Germany, the front of the support plates are for this purpose laminated with a white, retroreflective film, while a black decorative film is pressed onto the character legend.

Owing to the increasing requirements with respect to the forgery protection of motor vehicle number plates, the retroreflective films laminated with the support plate of a motor vehicle number plate or the decorative films have already been provided with additional security features which are not directly recognizable with the naked human eye and therefore do not impair the appearance of the motor vehicle number plate and the readability thereof. For this purpose, the security features are formed, for example, particularly small and are introduced so that they are visible only from very specific viewing angles.

Thus, DE 102 41 803 A1 discloses a blocking film with a substrate film and a decorative layer detachable therefrom for stamping a motor vehicle number plate in the area of the character legend. The blocking film is individualized by introducing security features by removing areas of the decorative layer, changing the color of said areas or bonding said areas nondetachably to the substrate film.

Such additional security features have, however, proved to be relatively easy to copy, so that there is still a need to provide a forgery-proof film for coating the character legend. In particular, the optically variable effects which are produced by one of the films mentioned at the outset, which comprise at least one transparent replicating layer having a diffractive relief structure and a reflective layer would be of particular interest as additional security features owing to their high level of protection against forgery and/or impressive decorative effect.

This applies not only to motor vehicle number plates but also to the abovementioned components in the interior of a motor vehicle, in the case of pieces of furniture, packagings and certain valuable documents such as in the area of a magnetic stripe of a bank card and the like. There is therefore generally the need for forgery-proof and/or decorative films which, for these specific applications, substantially preserve the usual appearance of the articles coated therewith.

SUMMARY OF THE INVENTION

It is therefore the object of the invention to provide a film which has a diffractive relief structure producing an optically variable effect, the optically variable effect being recognizable or becoming recognizable to an observer only on closer examination of the film, and to provide a method for the production thereof.

The object is achieved for the film which comprises at least one transparent replicating layer having a diffractive relief structure and a reflective layer by forming the reflective layer by means of at least one pigmented lake layer which is arranged directly adjacent to the diffractive relief structure, a refractive index $n_1$ of the at least one lake layer and a refractive index $n_2$ of the replicating layer being chosen so that a contribution of a difference between imaginary parts of the refractive indices $n_1$ and $n_2$ is in the range of 0.05 to 0.7, and a lightness L* of the at least one lake layer being in the range of 0 to 90, the film showing a latent optically variable effect produced by the diffractive relief structure.

A "latent" optically variable effect is understood as meaning that the optically variable effect is recognizable for an observer of the film only under certain external conditions. In comparison with optically variable effects which are recognizable on films having metallic reflective layers, the film according to the invention shows only a weak or discrete optically variable effect which is optionally evident only under illumination by a suitable light source.

Thus, an observer recognizes not only the color effect of the at least one lake layer but furthermore an optically variable effect which is produced by the diffractive relief structure, increases the protection against forgery and/or has decorative properties, preferably only on assessment of the film according to the invention on a side of the replicating layer which faces away from the diffractive relief structure under standard illumination and at a first distance of not more than about 0.5 m from the film and/or with illumination of the film by a suitable light source or point light source, wherein recognizability may also be possible at an even greater distance with such illumination.

At the same time, however, substantially only the color effect of the lake layer is recognizable for an observer under normal illumination and at a second distance of greater than about 0.5 m from the film, in particular at a distance of at least 1 m to 2 m from the film. The optically variable effect produced by the diffractive relief structure is no longer recognizable or substantially no longer recognizable, so that the optical appearance of the article coated with a film according to the invention does not deviate or deviates only to an insignificant extent from that of a conventional, colored article.

Viewing under standard illumination is understood here as being in particular viewing of the film according to the invention in a color matching cabinet, such as, for example, bykospectra version 2, the standard illuminant D65 being used for illumination.

The use of a pigmented lake layer instead of a metallic or nonmetallic inorganic reflective layer therefore permits the formation of a film which has latent optically variable effects which are not striking or are only slightly striking when viewed normally and do not or scarcely dazzle or irritate the eye.

The refractive index of a material is composed of a real part and an imaginary part, the imaginary part being responsible for the light absorption of the material. With the use of the at least one lake layer instead of a conventional reflective layer, the light diffraction in reflection is also partly caused by the imaginary part of the refractive index of the lake layer. The diffraction efficiencies of relief structures in the form of first order diffraction gratings are typically in the range of 0.2 to 2% here. The real part of the refractive index of a lake layer usually differs slightly from the real part of the refractive index of a replicating layer. The light diffracted by the diffractive relief structure owing to the differences in the refractive indices of the at least one lake layer and the replicating layer in reflection is furthermore superposed by the light scattered by the lake layer, with the result that the diffraction effect is weakened. The match between the light diffracted at the interface between the at least one lake layer and the replicating layer and the light scattered back by the at least one lake layer permits the formation of the latent optically variable effect. In principle, all colors can be used for coloring the at least one lake layer, but the superposition of the diffracted light with the back-scattered light is all the weaker the greater the extent to which the lake layer absorbs incident light.

A film according to the invention has the advantage that the presence of a forgery-proof or particularly attractive film is not imparted to an observer on viewing the film from a certain distance and/or on superficial viewing, but only the presence of a simple colored coating. Only on closer inspection of the film at a small distance from the film and/or under special illumination of the film or more strongly by special illumination of the film are the optically variable effects produced by the diffractive relief structure clearly recognizable, it being necessary here to assume diffraction effects which tend to be not very striking or have relatively little luminosity in comparison with the strong color effect of the pigmented lake layer.

The lightness $L^*$ of the lake layer used is determined in particular by means of the CIE-LAB Datacolor SF 600 measuring system, which is based on a spectrophotometer. In the calorimetric determination of color differences in the case of surface colors according to the CIELAB formula $L^*a^*b^*$, the value $L^*$ represents the light/dark axis, the value $a^*$ represents the red/green axis and the value $b^*$ represents the yellow/blue axis. The $L^*a^*b^*$ color space is thus described as a three-dimensional coordinate system, the $L^*$ axis describing the lightness and possibly assuming a value between 0 and 100.

The measurement of the lightness $L^*$ is effected here under the following conditions:
Geometry of measurement: diffuse/8° according to DIN 5033 and ISO 2496
Diameter of measuring opening: 26 mm
Spectral range: 360-700 nm according to DIN 6174
Standard illuminant: D65

In particular, point light sources in the form of torches, halogen lamps or motor vehicle headlights are suitable as light sources for illuminating the film according to the invention and for visualizing the optically variable effects. However, directly incident sunlight is optionally also suitable as a light source.

Preferred configurations of the film according to the invention are described below.

Here, lake layer is understood as meaning not only layers formed from colored lakes but also colored adhesive or plastic layers. The at least one lake layer is applied to the replicating layer in particular by printing, casting, applying with a doctor blade, spraying on, applying by extrusion, etc.

The layer thickness of a lake layer is in particular in the range of 1 μm to 50 μm, preferably in the range of 2 μm to 10 μm.

For the formation of a replicating layer, coating layers, in particular comprising radiation-crosslinking coatings (such as UV coatings) or thermally crosslinking coatings, are preferably used. However, thermoplastics or conventional positive or negative photoresists can also be used.

The layer thickness of a replicating layer is in particular in the range of 0.1 μm to 50 μm, preferably in the range of 0.2 μm to 1 μm. The replicating layer can, however, also serve as a self-supporting substrate film for the application of further layers, such as the at least one lake layer, and may be far thicker, for example in the range of up to 3 mm thickness.

Depending on the material chosen for the replicating layer, the relief structure is introduced into the replicating layer in particular by means of a tool appropriately profiled on its surface, such as a punch or a roll, lithographic process or laser ablation. A possible variant is provided by UV replication, in which a profiled transparent tool is brought into contact with a replicating layer comprising a UV coating and at the same time curing of the UV coating by means of a UV radiation source is effected. Thermal replication, in which a heated profiled tool is brought into contact with a replicating layer comprising thermoplastic material, is particularly preferred.

It has proved useful regarding the film if the pigmentation of the at least one lake layer is chosen so that a pigmentation number PN is in the range of 1.5 to 120 cm³/g, in particular in the range of 5 to 120 cm³/g, the pigmentation number PN being calculated according to $$PN = \sum_{1}^{x} \frac{(m_P \times f)_x}{(m_{BM} + m_A)} \text{ and } f = \frac{ON}{d},$$

the following being applicable:
$m_P$=mass of a pigment in the lake layer in g,
$m_{BM}$=constant; mass of a binder in the lake layer in g,
$m_A$=constant; mass of solids of the additives in the lake layer in g, ON=oil absorption number of a pigment (according to DIN 53199), d=density of a pigment (according to DIN 53193), x=running variable, corresponding to the number of different pigments in the lake layer.

In this way, starting from a composition found to be suitable for a lake layer, further possible pigmentations differing therefrom can be calculated rapidly and in an uncomplicated manner.

It has proved to be advantageous if pigmentation of the at least one lake layer is chosen so that a transmittance T of visible light through the at least one lake layer is <75%.

The transmittance T, i.e. the degree of transmission of the at least one lake layer, is determined in particular by means of a spectrophotometer, for example of the Hitachi U-2000 type, measurement being effected in a wavelength range between 360 and 700 nm.

The greater the transmittance T of the pigmented lake layer, the less pronounced is the optically variable effect and the lower its degree of recognizability.

Furthermore, it has proved to be advantageous if the transmittance T of visible light through the at least one lake layer is in the range of 1 to 75%, in particular in the range of 1 to 50%, particularly preferably in the range of 1 to 25%.

It is particularly advantageous if the optically variable effect produced by the diffractive relief structure is recognizable for the observer on viewing the film on that side of the replicating layer which faces away from the diffractive relief structure, under standard illumination at a first distance of not more than about 0.5 m from the film and additionally with illumination of the film by a suitable light source. The use of a simple point light source available to everyone, for example in the form of a torch, is suitable for simple and economical monitoring of the genuineness of the film, even by an untrained person.

The optically variable effect latently produced by the diffractive relief structure manifests itself in particular in that the film, when viewed from different viewing angles, shows different colors and/or different image motifs and/or different alphanumeric characters and/or different dullnesses and the like. Optically variable elements which are present in the form of holograms, holographic displays with kinematic effect, lens elements or matt structures which are produced by means of the diffractive relief structure are particularly preferably formed. optically variable elements produced by means of linear or cross gratings have also proved useful.

A diffractive relief structure is determined in particular by parameters such as spatial frequency, azimuth, profile shape, profile height h, etc. A film according to the invention may contain two or more different types of diffractive relief structures which differ with respect to these parameters.

In general, symmetrical or asymmetrical relief structures, in particular having a sinusoidal, rectangular, sawtooth-like, etc. profile, are suitable as diffractive relief structures. The relief structure may form a diffraction grating, such as a linear grating, a cross grating, a blaze grating, a lens structure comprising concentric or nonconcentric ring structures and the like.

The spatial frequency of a diffraction grating is preferably chosen in the range of 50 to 4000 lines/mm, a range of 100 lines/mm to about 3000 lines/mm being preferred.

The geometric profile height h of a diffractive relief structure has in particular a value in the range of 50 to 5000 nm, when viewed in the cross section of the replicating layer, preferred values being in the range of 75 to 2000 nm. The profile height h is determined by determining the height difference between the highest point and the lowest point adjacent thereto of a relief structure. The highest point is so to speak defined by the peak of a mountain and the lowest point by the bottom of a valley which forms the relief structure.

The use of diffractive relief structures which have a complex surface profile with locally different profile heights is also possible. Such surface profiles may also be stochastic surface profiles which form matt structures.

On the microscopic scale, matt structures possess fine relief structure elements which determine the scattering power and can be described only by statistical characteristics, such as, for example, center line average value Ra, correlation length lc, etc., the values for the center line average value Ra being in the range of 20 nm to 5000 nm, with preferred values in the range of 50 nm to 1000 nm, while the correlation length lc in at least one direction has values in the range of 200 nm to 50 000 nm, preferably in the range of 500 nm to 10 000 nm.

The microscopically fine relief structure elements of an isotropic matt structure have no azimuthal preferred direction, and it is for this reason that the scattered light having an intensity greater than a predetermined limit, for example specified by the visual recognizability, is uniformly distributed in a solid angle predetermined by the scattering power of the matt structure, in all azimuthal directions, and the surface element appears white to grey in daylight. In the case of a change in the angle of tilt away from the vertical, the surface element appears dark. Strongly scattering matt structures distribute the scattered light in a larger solid angle than weakly scattering matt structures. If the relief elements of the matt structure have a preferred direction, such as, for example, asymmetric matt structures, the scattered light has an anisotropic distribution.

As already mentioned above, in the case of light, strongly scattering lake layers, the diffraction effects appear comparatively weak owing to the back-scattered light, whereas the diffraction effects appear strong in the case of dark, strongly absorbing colors since scarcely any light is scattered back by the lake layer. Thus, with the use of a light-pigmented lake layer, the recognizability of the latent optically variable effects is under certain circumstances so greatly impaired by the light scattered back by the at least one lake layer in the direction of the observer that the optically variable effect becomes evident only at very specific viewing angles or with special illumination and/or luminous intensity. It has therefore proved useful if with increasing lightness L* of the at least one lake layer, the contribution of the difference between the imaginary parts of the refractive indices $n_1$ and $n_2$ increases proportionally. This means that, with the use of a dark-colored lake layer, the imaginary parts of the refractive indices of the lake layer and of the replicating layer can be relatively close together without the recognizability of the latent optically variable effect of the film being impaired from a small distance and optionally with special illumination. With the use of a light-colored lake layer, on the other hand, it has proved to be advantageous if the imaginary parts of the refractive indices of the lake layer and of the replicating layer are not so close together so that the latent optically variable effect of the film is recognizable from a small distance and optionally with special illumination.

It has proved to be useful if the contribution of the difference between the imaginary parts of the refractive indices $n_1$ and $n_2$ is in the range of 0.05 to 0.7 in the case of a lightness L* of the at least one lake layer in the range of 0 to about 50, which corresponds to a dark hue, and if the contribution of the difference between the imaginary parts of the refractive indices $n_1$ and $n_2$ is in the range of 0.3 to 0.7 in the case of a lightness L* of the at least one lake layer in the range of about 50 to 90, which corresponds to a light hue.

The relationship which is preferred for the film between the lightness L* of the lake layer and the contribution of a difference between the imaginary parts of the refractive indices $n_1$ and $n_2$ is shown by way of example in FIG. 1.

The film may provide further security features in order further to increase its protection against forgery. Thus, it has proved to be useful if the film contains a machine-readable code. A code is preferably used in order to collate information in coded form on the film, which information can be evaluated, for example, for monitoring purposes.

Thus, for example, it is possible to encrypt the alphanumeric characters of a character legend of a motor vehicle number plate, for example in relation to the place of registration, by means of a secret encryption algorithm and use the result of this encryption as a code. In the course of a check by the police, it is then possible, for example, to determine whether the code present actually contains the motor vehicle number plate information belonging to the character legend monitored.

Security-relevant data, such as, for example, information on the holder of the motor vehicle or on the motor vehicle itself in the case of the motor vehicle number plate, can also be coded as information. As a result, the data are not accessible to the public. In the course a check by the police, the information present can then be decoded and evaluated by means of suitable apparatuses.

The machine-readable code can be provided, for example, by the diffractive relief structure and may be present, for example, in the form of a one- or a two-dimensional barcode, a microtext, etc.

The machine-readable code can additionally or alternatively also be provided by the pigmentation of the at least one lake layer, by forming said layer, for example, partly differently and/or with particular properties. Thus, an individual lake layer may have conductive pigments and/or magnetic pigments and/or luminescent pigments and/or thermochromic pigments, etc., which provide or supplement the code.

The use of a plurality of different lake layers side by side on the transparent replicating layer is readily possible. Thus, different lake layers can be used in any combination with one another. Different lake layers may contain different pigments comprising materials which have different colors or which have the same color but are otherwise distinguishable. Thus, lake layers with the same color can be distinguished by specific pigments which can be recognized only under specific conditions, such as, for example, luminescent pigments, magnetic pigments, electrically conductive pigments, thermochromic pigments, etc.

A first lake layer may have only colored pigments and a further lake layer may have the same color but additionally contain at least one specific pigment. Two lake layers having the same color may contain in each case specific pigments which differ in their properties, such as an excitation wavelength, the magnetic properties and the like.

All colored pigments which are usually used in gravure printing can be used in the at least one lake layer. These usually have a particle diameter in the range of 20 nm to 5 μm.

With the use of different lake layers, formation of demanding patterns, for example in the form of guilloches, micro inscription, symbols, logos, one- and two-dimensional bar codes and the like, is possible. These patterns may be visible under standard lumination and/or are recognizable under specific conditions, such as UV irradiation, heating, etc.

It has proved useful if, viewed perpendicularly to the plane of the transparent replicating layer, at least two different lake layers are arranged in different regions of the diffractive relief structure, which lake layers differ in their refractive indices and/or in their lightness L* and/or in their pigmentation number PN and/or in their transmittance T. As a result, it is possible to create areas, in particular pattern-like areas, in which the latent optically variable effects of the diffractive relief structure are more strongly evident than in adjacent areas on viewing close-up.

Furthermore, it has proved useful if, viewed perpendicularly to the plane of the transparent replicating layer, at least one further colored or colorless coating layer whose refractive index $n_3$ does not differ or differs by less than 0.05 from the refractive index $n_1$ of the transparent replicating layer is present at least in a region of the transparent replicating layer, in particular in a region of the diffractive relief structure. Such a colored or colorless coating layer results in complete extinction of the optically variable effect of the diffractive relief structure since the incident light is not refracted or is not refracted to a significant extent at the interface between the replicating layer and the colored or colorless coating layer.

It is therefore possible to produce films which show the latent optically variable effect only in pattern-like areas, i.e. only from area to area, although the relief structure is present everywhere. A contour of the pattern-like areas in which the latent optically variable effect is present can thereby form a further readable security feature of the film.

Alternatively, the relief structure may be present only in areas of the replicating layer in order to achieve the same effect.

The film is in particular in the form of a self-supporting laminated film or in the form of transfer film which has a substrate film and a transfer layer detachable therefrom and comprising the replicating layer and the at least one lake layer. A laminated film has in particular a transparent substrate film on which the replicating layer, the at least one lake layer and optionally an adhesive layer are arranged. If the replicating layer is self-supporting, the laminated film can, however, also comprise only the replicating layer, the at least one lake layer and optionally the adhesive layer. Substrate films are usually formed in a layer thickness in the range of 4.5 μm to 100 μm, preferably in the range of 12 μm to 50 μm.

The object is achieved for the method for the production of a film according to the invention comprising the following steps:

formation of the transparent replicating layer having the refractive index $n_1$, formation of the diffractive relief structure on one side of the replicating layer, formation of the at least one pigmented lake layer having the refractive index $n_2$ and the lightness L* on the replicating layer and directly adjacent to the diffractive relief structure by means of at least one pigmented composition, the at least one pigmented composition being applied in the flowable state and not impairing the replicating layer.

The pigmented composition is formed in particular so that it does not attack, partly dissolve or completely dissolve the replicating layer, so that the relief structure is preserved unchanged. The composition for the formation of the at least one lake layer can thus neither extinguish, round or otherwise impair the diffractive relief structure formed in the replicating layer. The profile shape of the relief structure is satisfactorily preserved.

The at least one lake layer is formed on a solidified replicating layer in which the diffractive relief structure is formed. Whether the solidification of the replicating layer is effected by a chemical curing process, by cooling or by simple drying, optionally with supply of air and/or heat, optionally with simultaneous formation of the relief structure, is not important.

Preferably, the transparent replicating layer is formed by a transparent replicating coating in the form of a thermoplastic coating, a thermally crosslinking coating or a chemically crosslinking coating, in particular a UV-crosslinking coating or a two-component coating system comprising a resin and a curing agent.

It is preferable if, for the formation of a lake layer, a pigmented composition is formed from a pigmented lake of the following composition:
- 0-50% by weight of water
- 1-10% by weight of organic solvent or solvent mixture
- 1-40% by weight of colored pigment(s)
- 0.1-5% by weight of additive for stabilizing the pigment dispersion/emulsion
- 0.5-10% by weight of dispersing additive
- 0.5-10% by weight of inorganic filler or filler mixture
- 25-90% by weight of polymer dispersion and/or polymer emulsion and/or polymer solution In particular, the pigmented lake is formed with the following composition:
- 25-35% by of water weight
- 4-8% by weight of organic solvent or solvent mixture
- 5-10% by weight of colored pigment(s)
- 0.5-1% by weight of additive for stabilizing the pigment dispersion/emulsion
- 0.5-2% by weight of dispersing additive
- 0.5-3% by weight of inorganic filler or filler mixture
- 35-60% by weight of polymer dispersion and/or polymer emulsion and/or polymer solution The polymer dispersion and/or polymer emulsion and/or polymer solution acts here in particular as a film former.

It has proved useful if an acrylate polymer emulsion, an acrylate copolymer emulsion or an anionic acrylate copolymer emulsion is used as the polymer emulsion.

Furthermore, it has proved useful if a polyurethane dispersion or a polyester resin dispersion or a vinyl acetate-ethylene copolymer dispersion is used as the polymer dispersion.

A water-soluble or water-dilutable urea resin, dissolved in or diluted with water, is preferably used as the polymer solution, it also being possible for the resin to be dissolved in water and organic solvent or to be diluted with water and organic solvent. However, other film-forming polymer solutions, based on water and/or based on solvent, can also be used.

In particular, the use of an emulsion or of a dispersion having a solids content of at least 30% by weight and a density d in the range of 1.01 to 1.1 $g/cm^3$ have proved useful.

For the formation of the pigmented lake, in particular an acrylate copolymer emulsion having a solids content of 38%, a density of 1.05 $g/cm^3$ and a glass transition temperature $T_g$ of about 15° C. have proved suitable as the film-former.

Alternatively, all film formers which, owing to their formulation, do not impair the replicating layer and have sufficient adhesion to the replicating layer, such as, for example, water-based systems, UV-curing systems, etc., are suitable. Solvent-based systems can also be used provided that a replicating layer is formed from a crosslinked plastic.

The use of a film according to the invention for coating motor vehicle number plates with formation of the character legend which contains alphanumeric characters is ideal.

However, the use of a film according the invention for coating packagings, plastic parts for the interior of motor vehicles, pieces of furniture and valuable documents, such as bank cards, tickets or lottery tickets, has also proved useful. In the case of bank cards, such as EC cards or credit cards, which have a magnetic stripe, the magnetic stripe is preferably formed by a film according to the invention.

BRIEF DESCRIPTION OF THE DRAWINGS

FIGS. 1 to 6 are intended to illustrate the invention by way of example. Thus,

FIG. 1 shows a diagram of the preferred relationship between the lightness L* of a lake layer and the contribution of the difference An between the refractive indices of a replicating layer and of a lake layer, this corresponding to the difference between the imaginary parts of the refractive indices;

FIG. 2 shows a first film in cross section;

FIG. 3 shows a second film in the form of a laminated film in cross section;

FIG. 4 shows a third film in the form of a transfer film in cross section;

FIG. 5 shows a cross section Y-Y' through a motor vehicle number plate according to FIG. 6; and FIG. 6 shows a motor vehicle number plate in plan view.

DETAILED DESCRIPTION OF THE PREFERRED EMBODIMENTS

Figure 1:
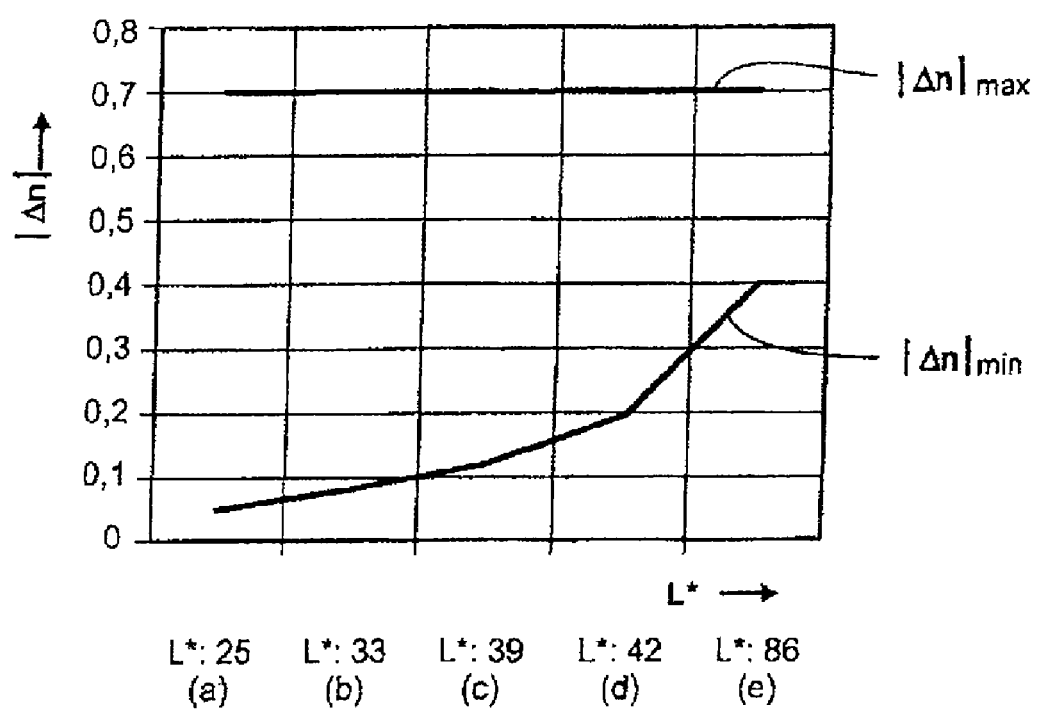

FIG. 1 shows a diagram for the preferred relationship between the lightness L* of a lake layer and the contribution of the difference between the refractive indices An of a replicating layer and of a lake layer. In this example, the real part of the refractive index $n_1$ of the lake layer and of the real part of the refractive index $n_2$ of the replicating layer are equal, so that the real parts of the refractive indices $n_1$, $n_2$ can be neglected and the contribution of An in the diagram gives only the difference between the imaginary parts of the refractive indices $n_1$, $n_2$. The lightness L* is shown for lake layers (a) to (e) comprising different colored pigments.

The letters (a) to (e) in FIG. 1 represent lake layers having different colors:
(a)=black or grey lake layer having lightness L* in the range of 0-50
(b)=blue lake layer having lightness L* in the range of 10-90
(c)=red lake layer having lightness L* in the range of 20-90
(d)=green lake layer having lightness L* in the range of 10-90
(e)=yellow lake layer having lightness L* in the range of 50-90.

The value |Δn|, i.e. the contribution of the difference between the imaginary parts of the refractive index $n_1$ of the replicating layer and of the refractive index $n_2$ of a pigmented lake layer, is preferably in the range of 0.05 to 0.7 for a black lake layer (a).

This means that, in the case of a black-pigmented lake layer, the latent optically variable effect is still recognizable even when the imaginary parts of the refractive indices of the replicating layer and lake layer differ by only 0.05. The lighter the coloring of the pigmented lake layer, the greater the chosen value |Δn| is to be so that the latent optically variable effect is still recognizable with the naked eye without problems.

This is clear from the shape of the curve $|\Delta n|_{min}$ over the lightness L* of the lake layer with a coloring of black (a) through blue (b), red (c), green (d) to yellow (e).

Thus, the curve $|\Delta n|_{min}$ increases with increasing lightness L* of the lake layer. In the case of a yellow lake layer, the value |Δn| is in the range of 0.4 to 0.7.

This means that the imaginary parts of the refractive indices of replicating layer and yellow lake layer should be chosen so that they differ by at least 0.4 in order for the latent optically variable effect to be recognizable and not to be made unrecognizable or only poorly perceptible owing to the light scattered back from the yellow lake layer in the direction of the observer.

Examples of compositions for the formation of a replicating layer and differently colored lake layers (a) to (e) are given below.

The replicating layer has been formed, for example, from a lake with the following composition (in g):
17 000 of methyl ethyl ketone
1000 of diacetone alcohol
1500 of acrylic polymer based on methyl methacrylate (density d=1.19 g/cm$^3$)
2750 of cellulose nitrate moistened with denatured ethanol, 65% (density d=1.25 g/cm$^3$)
1500 of polyisocyanate based on isophorone diisocyanate Lake for the Formation of a Black Lake Layer (a) With Minimum Pigmentation (in g):
2500 of water
2500 of organic solvent isopropyl alcohol
200 of basic additive, 25% in water (volatile)
400 of dispersing additive, solids: 40%
200 of silicon dioxide filler, mean particle size: 16 nm
100 of silicon dioxide filler, mean particle size: 7.5 μm
50 of carbon black pigment, density d=1.8 g/cm$^3$, ON=230
2500 of binder I: acrylate copolymer emulsion, solids: 37.5%
4000 of binder II: acrylate copolymer emulsion, solids: 55%
The following is applicable to this black lake:

$$PN = \sum_{1}^{x} \frac{(m_P \times f)_x}{(m_{BM} + m_A)} = \frac{50 \text{ g} \times 127.8 \frac{cm^3}{g}}{3137.5 \text{ g} + 160 \text{ g}} = 1.9 \frac{cm^3}{g}$$

where $m_P$=50 g of carbon black
f=ON/d=230/1.8 g/cm$^3$=127.8 cm$^3$/g (for carbon black)
$m_{BM}$=(0.375·2500 g of binder I)+(0.55·4000 g of binder II)=937.5 g of binder I+2200 g of binder II=3137.5 g of binder
$m_A$=0.4·400 g of dispersing additive=160 g of solids of the dispersing additive Lake for the Formation of a Black Lake Layer (a) With Maximum Pigmentation (in g):
2500 of water
2500 of organic solvent isopropyl alcohol
200 of basic additive, 25% in water (volatile)
400 of dispersing additive, solids: 40%
200 of silicon dioxide filler, mean particle size: 16 nm
100 of silicon dioxide filler, mean particle size: 7.5 μm
2500 of carbon black pigment, density d=1.8 g/cm$^3$, ON=230
2500 of binder I: acrylate copolymer emulsion, solids: 37.5%
4000 of binder II: acrylate copolymer emulsion, solids: 55%
The following is applicable to this black lake:

$$PN = \sum_{1}^{x} \frac{(m_P \times f)_x}{(m_{BM} + m_A)} = \frac{2500 \text{ g} \times 127.8 \frac{cm^3}{g}}{3137.5 \text{ g} + 160 \text{ g}} = 96.9$$

where $m_P$=2500 g of carbon black
f=ON/d=230/1.8 g/cm$^3$=127.8 cm$^3$/g (for carbon black)
$m_{BM}$=(0.375·2500 g of binder I)+(0.55·4000 g of binder II)=937.5 g of binder I+2200 g of binder II=3137.5 g of binder
$m_A$=(0.4·400 k of dispersing additive)=160 g of solids of the dispersing additive Lake for the Formation of a Blue Lake Layer (b) (in g):

$L^*$=33.58 $a^*$=0.54 $b^*$=−30.23

2500 of water
2500 of organic solvent isopropyl alcohol
200 of basic additive, 25% in water (volatile)
400 of dispersing additive, solids: 40%
200 of silicon dioxide filler, mean particle size: 16 nm
100 of silicon dioxide filler, mean particle size: 7.5 μm
1200 of phthalocyanine blue pigment, density d=1.5 g/cm$^3$, ON=43
2500 of binder I: acrylate copolymer emulsion, solids: 37.5%
4000 of binder II: acrylate copolymer emulsion, solids: 55%
The following is applicable to this blue lake:

$$PN = \sum_{1}^{x} \frac{(m_P \times f)_x}{(m_{BM} + m_A)} = \frac{1200 \text{ g} \times 28.7 \frac{cm^3}{g}}{3137.5 \text{ g} + 160 \text{ g}} = 10.4$$

where $m_P$=1200 g of phthalocyanine blue pigment
f=ON/d=43/1.5 g/cm$^3$=28.7 cm$^3$/g (for phthalocyanine blue pigment)
$m_{BM}$=(0.375·2500 g of binder I)+(0.55·4000 g of binder II)=937.5 g of binder I+2200 g of binder II=3137.5 g of binder
$m_A$=(0.4·400 g of dispersing additive)=160 g of solids of the dispersing additive Lake for the Formation of a Red Lake Layer (c) (in g):

$L^*$=38.43 $a^*$=44.23 $b^*$=20.44

2500 of water
2500 of organic solvent isopropyl alcohol
200 of basic additive, 25% in water (volatile)
400 of dispersing additive, solids: 40%
200 of silicon dioxide filler, mean particle size: 16 nm
100 of silicon dioxide filler, mean particle size: 7.5 μm
1200 of diketopyrrolopyrrole pigment, density d=1.35 g/cm$^3$, ON=49
2500 of binder I: acrylate copolymer emulsion, solids: 37.5%
4000 of binder II: acrylate copolymer emulsion, solids: 55%
The following is applicable to this red lake:

$$PN = \sum_{1}^{x} \frac{(m_P \times f)_x}{(m_{BM} + m_A)} = \frac{1200 \text{ g} \times 36.3 \frac{cm^3}{g}}{3137.5 \text{ g} + 160 \text{ g}} = 13.2 \frac{cm^3}{g}$$

where $m_P$=1200 g of diketopyrrolopyrrole pigment
f=ON/d=49/1.35 g/cm$^3$=36.3 cm$^3$/g (for diketopyrrolopyrrole pigment)
$m_{BM}$=(0.375·2500 g of binder I)+(0.55·4000 g of binder II)=937.5 g of binder I+2200 g of binder II=3137.5 g of binder
$m_A$=(0.4·400 g of dispersing additive)=160 g of solids of the dispersing additive Lake for the Formation of a Dark Green Lake Layer (d) (in g)

$L^*$=14.52 $a^*$=−49.34 $b^*$=10.91

2500 of water
2500 of organic solvent isopropyl alcohol
200 of basic additive, 25% in water (volatile)
400 of dispersing additive, solids: 40%
200 of silicon dioxide filler, mean particle size: 16 nm
100 of silicon dioxide filler, mean particle size: 7.5 μm 1200 of chlorinated copper phthalocyanine pigment, density $d=2.03$ g/cm$^3$, ON=30
2500 of binder I: acrylate copolymer emulsion, solids: 37.5%
4000 of binder II: acrylate copolymer emulsion, solids: 55%
The following is applicable to this dark green lake:

$$PN = \sum_{1}^{x} \frac{(m_P \times f)_x}{(m_{BM} + m_A)} = \frac{1200 \text{ g} \times 14.8 \frac{cm^3}{g}}{3137.5 \text{ g} + 160 \text{ g}} = 5.4 \frac{cm^3}{g}$$

where $m_P$=1200 g of chlorinated copper phthalocyanine pigment
 f=ON/d=30/2.03 g/cm$^3$=14.8 cm$^3$/g (for chlorinated copper phthalocyanine pigment)
 $m_{BM}$=(0.375·2500 g of binder I)+(0.55·4000 g of binder II)=937.5 g of binder I+2200 g of binder II=3137.5 g of binder
 $m_A$=(0.4·400 g of dispersing additive)=160 g of solids of the dispersing additive
Lake for the Formation of a Yellow Lake Layer (e) (in g):

$L^*$=86.35 $a^*$=1.91 $b^*$=89.79

Figure 2:
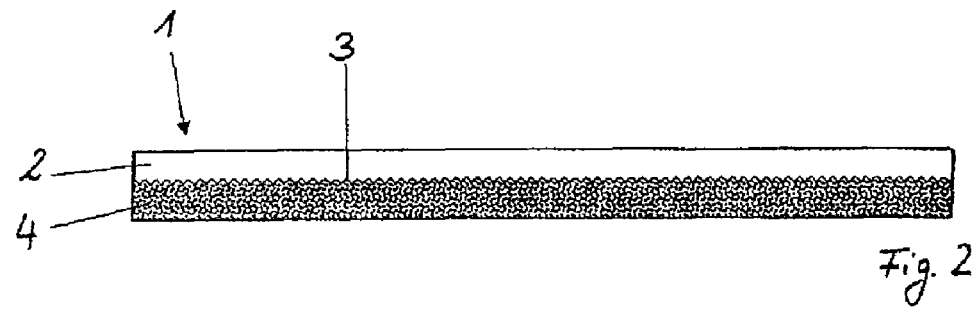

2500 of water
2500 of organic solvent isopropyl alcohol
200 of basic additive, 25% in water (volatile)
400 of dispersing additive, solids: 40%
200 of silicon dioxide filler, mean particle size: 16 nm
100 of silicon dioxide filler, mean particle size: 7.5 μm
1200 of monoazo-benzimidazolone pigment, density $d=1.57$ g/cm$^3$, ON=56
2500 of binder I: acrylate copolymer emulsion, solids: 37.5%
4000 of binder II: acrylate copolymer emulsion, solids: 55%
The following is applicable to this yellow lake:

$$PN = \sum_{1}^{x} \frac{(m_P \times f)_x}{(m_{BM} + m_A)} = \frac{1200 \text{ g} \times 35.7 \frac{cm^3}{g}}{3137.5 \text{ g} + 160 \text{ g}} = 13 \frac{cm^3}{g}$$

where $m_P$=1200 g of monoazo-benzimidazolone pigment
 f=ON/d=56/1.57 g/cm$^3$=35.7 cm$^3$/g (for monoazo-benzimidazolone pigment)
 $m_{BM}$=(0.375·2500 g of binder I)+(0.55·4000 g of binder II)=937.5 g of binder I+2200 g of binder II=3137.5 g of binder
 $m_A$=(0.4·400 g of dispersing additive)=160 g of solids of the dispersing additive
FIG. 2 shows a first film 1 in cross section, which has a transparent replicating layer 2 having a diffractive relief structure 3 and a colored lake layer 4. The lake layer 4 is directly adjacent to that side of the replicating layer 2 on which the diffractive relief structure 3 is present. The replicating layer 2 has a layer thickness of 0.5 μm, while the lake layer has a layer thickness of 3 μm.

Here, the replicating layer 2 is thermoplastic and has been formed from a coating of the following composition already mentioned above (in g):
17 000 of methyl ethyl ketone
1000 of diacetone alcohol
1500 of acrylic polymer based on methyl methacrylate (density $d=1.19$ g/cm$^3$)
2750 of cellulose nitrate moistened with denatured ethanol, 65% (density $d=1.25$ g/cm$^3$)
1500 of polyisocyanate based on isophorone diisocyanate The diffractive relief structure 3 has been stamped in the form of a linear grating having a sinusoidal profile and a spatial frequency of 1000 lines/mm into the replicating layer 2 by means of a heated, profiled tool.

Here, the lake layer 4 has been formed from a black lake of the following composition (in g);
2500 of water
2500 of organic solvent isopropyl alcohol
200 of basic additive, 25% by weight in water (volatile)
400 of dispersing additive, solids: 40% by weight
200 of silicon dioxide filler (mean particle size: 16 nm)
100 of silicon dioxide filler (mean particle size: 7.5 nm)
1000 of carbon black pigment, density $d=1.8$ g/cm$^3$, oil number ON=230
2500 of binder I (acrylate copolymer emulsion, solids: 37.5% by weight)
4000 of binder II (acrylate copolymer emulsion, solids: 55% by weight)
The following is applicable to this black lake:

$$PN = \sum_{1}^{x} \frac{(m_P \times f)_x}{(m_{BM} + m_A)} = \frac{1000 \text{ g} \times 127.8 \frac{cm^3}{g}}{3137.5 \text{ g} + 160 \text{ g}} = 38.7 \frac{cm^3}{g}$$

where $m_P$=1000 g of carbon black
 f=ON/d=230/1.8 g/cm$^3$=127.8 cm$^3$/g (for carbon black)
 $m_{BM}$=(0.375·2500 g of binder I)+(0.55·4000 g of binder II)=937.5 g of binder I+2200 g of binder II=3137.5 g of binder
 $m_A$=(0.4·400 g of dispersing additive)=160 g of solids of the dispersing additive
When the film 1 is viewed on the sides of the replicating layer 2, a latent optically variable effect is seen.

Figure 3:
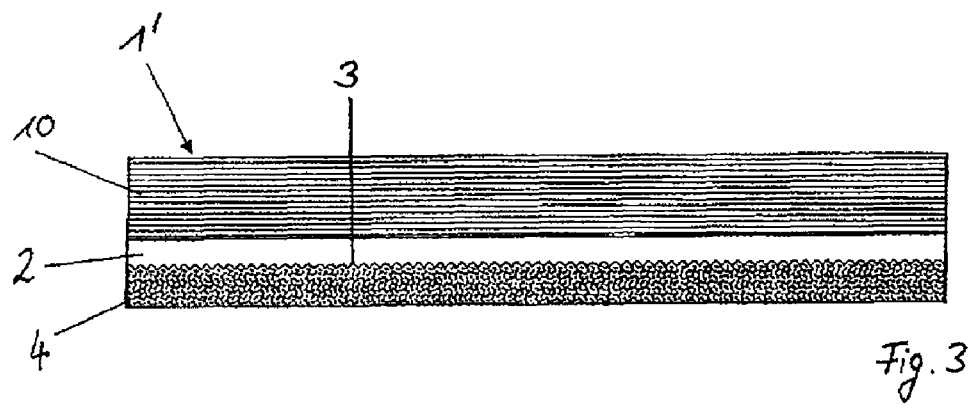

FIG. 3 shows a second film 1' in the form of a laminated film in cross section. The laminated film has a self-supporting transparent substrate film 10 comprising PET in a film thickness of 19 μm, adjacent to this the replicating layer 2 having the diffractive relief structure 3 and furthermore the lake layer 4. The replicating layer 2 and the lake layer 4 are formed as described in FIG. 2. The laminated film is applied to a substrate, not shown here, in such a way that the lake layer 4 is bonded to the substrate, in particular by means of an adhesive layer. The adhesive layer can be applied to the substrate and/or to the lake layer 4. The substrate film 10 is permanently bonded to the replicating layer 2 and remains as a protective layer over the replicating layer 2 and the lake layer 4 on the substrate. When the film 1' is viewed on the sides of the substrate film 10, a latent optically variable effect is seen.

Figure 4:
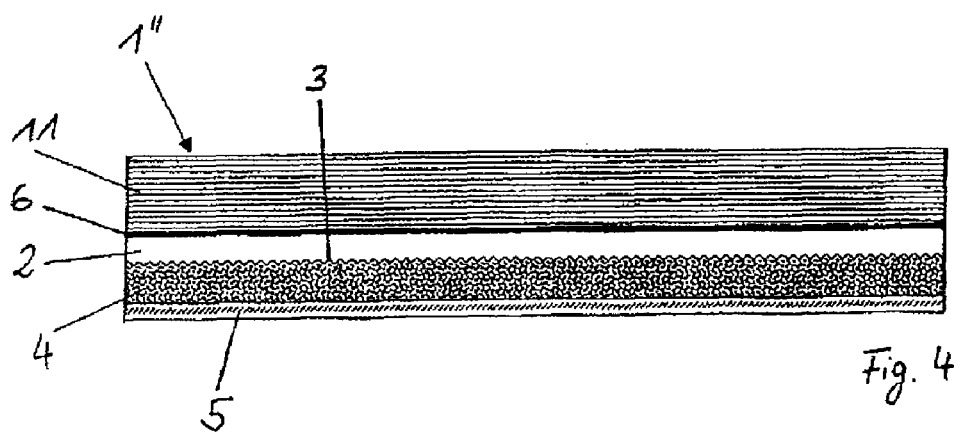

FIG. 4 shows a third film 1'' in the form of a transfer film in cross section. The transfer film has a substrate film 11 detachable from a transfer layer and comprising PET and having a layer thickness of 19 μm.

Arranged between the transfer layer and the detachable substrate film 11 is optionally a release layer 6 which permits or promotes separation of substrate film 11 and transfer layer. Such a release layer 6 is usually formed from wax, silicone or the like and frequently has a layer thickness in the range of 1 nm to 1.5 μm, in particular in the range of 4 nm to 12 nm.

Furthermore, a protective lacquer layer, for example having a layer thickness in the range of 0.5 μm to 15 μm, in particular in the range of 1 μm to 3 μm, can be arranged between the detachable substrate film 11 and the transfer layer or between the release layer 6 and the transfer layer, which protective lacquer layer remains on the transfer layer after detachment of the substrate film 11 and protects the surface thereof from mechanical and/or chemical attacks.

Such a protective lacquer layer may be formed, for example, from a lacquer of the following composition (in g):
2200 of methyl ethyl ketone
300 of butanol
1500 of acrylic polymer based on methyl methacrylate
30 of UV absorber
10 of light stabilizer
120 of feldspar, density d=2.6 g/m$^3$ The transfer layer of the transfer film according to FIG. 4 thus comprises, in this sequence, an optional protective lacquer layer, the replicating layer 2, the lake layer 4 and an adhesive layer 5 which is arranged on that side of the lake layer 4 which faces away from the substrate film 11. This may be a hotmelt adhesive layer or a cold adhesive layer. The adhesive layer 5 has in particular a layer thickness in the range of 0.2 to 10 µm, preferably in the range of 1 to 2.5 µm.

The transfer film according to FIG. 4 is arranged on a substrate so that the adhesive layer 5 faces the substrate. Thereafter, the adhesive of the adhesive layer 5 is activated and is bonded to the substrate. This can be effected over the whole area or only in regions, so that the transfer layer is adhering to the substrate completely or only in regions when the substrate film 11 is peeled off. If the transfer layer of the transfer film is transferred only in regions to a substrate, those regions of the transfer layer which are not fixed to the substrate by means of the adhesive layer 5 remain on the substrate film 11 and are removed with it.

Figure 5:
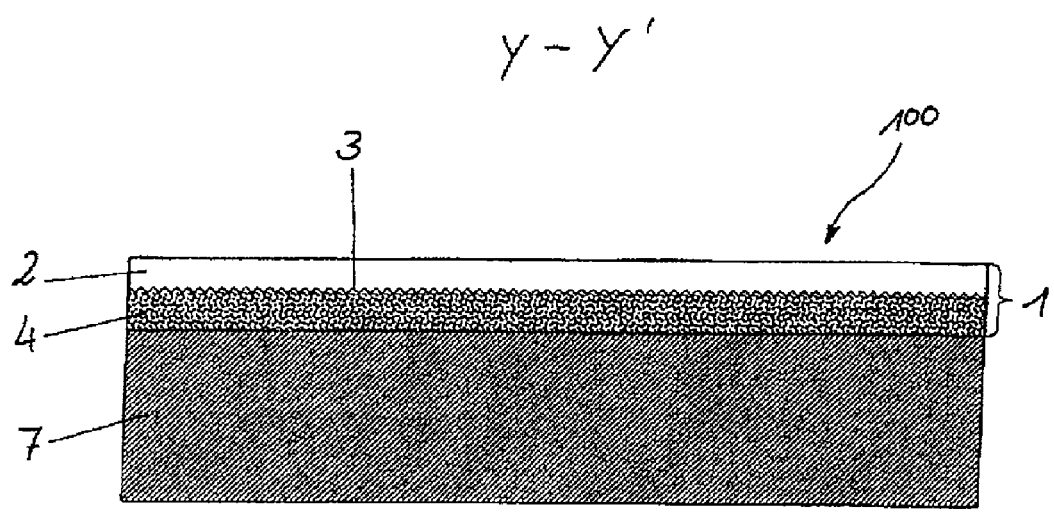

FIG. 5 shows a first film according to FIG. 2, applied to a substrate 7 in the form of a motor vehicle number plate 100, in cross section Y-Y' (cf. FIG. 6). The lake layer 4 is permanently adhesively bonded to the substrate 7.

FIG. 6 shows the motor vehicle number plate 100 from FIG. 5 in plan view. The motor vehicle number plate consists of a support plate 101 which is provided with a white, retroreflective coating and usually consisting of an aluminum or steel sheet. A raised character legend 102 is stamped into the support plate 101 by means of a mechanical stamping process. The character legend 102 consists of alphanumeric characters 102a, 102b, 102c, 102d, which, for example in Germany, indicate the place of registration of the motor vehicle and form an individual number. In order to make the character legend 102 of the stamped motor vehicle number plate 100 readily visible, the raised stamped regions are coated in color with a black film having a latent optically variable effect, the presence of which is indicated by the dotted white lines. A stamped raised border 103 of the motor vehicle number plate 100, which is likewise coated with the black film having a latent optically variable effect, is furthermore provided. For this purpose, an appropriate transfer of colored film is carried out by means of a transfer film which consists of a substrate film and a transfer layer detachable therefrom, as described, for example, in FIG. 4. In the case of the transfer of the transfer layer in regions, the transfer film is brought into mechanical contact with the raised stamped regions of the support plate 101 of the motor vehicle number plate 100 and the transfer layer is transferred in the exact position to the raised regions under pressure, optionally also under pressure and at elevated temperature.

However, other fields of use for the film, as described above, for example on surfaces of pieces of furniture, valuable documents, motor vehicle interior parts and the like, are of course also advantageous.

The invention claimed is:

1. A film which comprises at least one transparent replicating layer having a diffractive relief structure and a reflective layer, wherein the reflective layer is formed by at least one pigmented lake layer which is arranged directly adjacent to the diffractive relief structure, and wherein a refractive index $n_1$ of the at least one lake layer and a refractive index $n_2$ of the replicating layer are chosen so that a contribution of a difference between imaginary parts of the refractive indices $n_1$ and $n_2$ is in a range of 0.05 to 0.7, and wherein a lightness L* of the at least one lake layer is in a range of 0 to 90, the film showing a latent optically variable effect produced by the diffractive relief structure.

2. A film according to claim 1, wherein the pigmentation of the at least one lake layer is chosen so that a pigmentation number PN is in a range of 1.5 to 120 cm$^3$/g, the pigmentation number PN being calculated according to $$PN = \sum_1^x \frac{(m_P \times f)_x}{(m_{BM} + m_A)} \text{ and } f = \frac{ON}{d},$$

wherein:
$m_P$=mass of a pigment in the lake layer in g,
$m_{BM}$=constant; mass of a binder in the lake layer in g,
$m_A$=constant; mass of solids of additives in the lake layer in g,
ON=oil absorption number of a pigment,
d=density of a pigment,
x=running variable, corresponding to a number of different pigments in the lake layer.

3. A film according to claim 1, wherein pigmentation of the at least one lake layer is chosen so that a transmittance T of visible light through the at least one lake layer is less than 75%.

4. A film according to claim 3, wherein a transmittance T of visible light through the at least one lake layer is in the range of 1 to 50%.

5. A film according to claim 1, wherein the optically variable effect produced by the diffractive relief structure is recognizable for an observer on viewing the film on that side of the replicating layer which faces away from the diffractive relief structure, under standard illumination at a first distance of not more than about 0.5 m from the film with illumination by a suitable light source.

6. A film according to claim 1, wherein the optically variable effect manifests itself in that the film, when viewed from different viewing angles, shows different colors or different image motifs or different alphanumeric characters or different dullnesses.

7. A film according to claim 1, wherein the diffractive relief structure forms a hologram or a holographic display with kinematic effect or a lens structure or a matt structure or a linear or cross grating.

8. A film according to claim 1, wherein a contribution of the difference between the imaginary parts of the refractive indices $n_1$ and $n_2$ increases proportionally with increasing lightness L* of the at least one lake layer.

9. A film according to claim 8, wherein a contribution of the difference between the imaginary parts of the refractive indices $n_1$ and $n_2$ is in a range of 0.05 to 0.5 in a case of a lightness L* of the at least one lake layer in a range of 0 to 50, which corresponds to a dark hue, and in that a contribution of the difference between the imaginary parts of the refractive indices $n_1$ and $n_2$ is in a range of 0.3 to 0.5 in a case of a lightness L* of the at least one lake layer in a range of 50 to 90, which corresponds to a light hue.

10. A film according to claim 1, wherein the film contains a machine-readable code.

11. A film according to claim 1, wherein, viewed perpendicularly to a plane of the transparent replicating layer, at least two different lake layers are arranged in different regions of the diffractive relief structure, which lake layers differ in their imaginary parts of the refractive indices or in their lightness L* or in their pigmentation number PN.

12. A film according to claim 3, wherein, viewed perpendicularly to a plane of the transparent replicating layer, at least two different lake layers are arranged in different regions of the diffractive relief structure, which lake layers differ in their imaginary parts of the refractive indices or in their lightness L* or in their pigmentation number PN or in their transmittance T.

13. A film according to claim 1, wherein, viewed perpendicularly to a plane of the transparent replicating layer, at least one further colored coating layer whose refractive index $n_3$ does not differ or differs by less than 0.05 from the refractive index $n_1$ of the transparent replicating layer is present at least in a region of the diffractive relief structure.

14. A method for the production of a film according to claim 1 comprising the following steps:
   formation of the transparent replicating layer having the refractive index $n_2$,
   formation of the diffractive relief structure on one side of the replicating layer; and
   formation of the at least one pigmented lake layer having the refractive index $n_1$ and the lightness L* on the replicating layer and directly adjacent to the diffractive relief structure by means of at least one pigmented composition, the at least one pigmented composition being applied in a flowable state and neither attacking nor partially dissolving nor completely dissolving the replicating layer.

15. A method according to claim 13, wherein the pigmented composition is in a form of a thermoplastic coating or of a UV-curing coating or of a two-component coating system comprising a resin and a curing agent.

16. A method according to claim 15, wherein a pigmented composition is formed by a lake comprising:
   0-50% by weight of water;
   1-10% by weight of organic solvent or solvent mixture;
   1-40% by weight of colored pigment(s);
   0.1-5% by weight of additive for stabilizing the pigment dispersion/emulsion;
   0.5-10% by weight of dispersing additive;
   0.5-10% by weight of inorganic filler or filler mixture; and
   25-90% by weight of polymer dispersion or polymer emulsion or polymer solution.

17. A method according to claim 16, wherein the lake comprises:
   25-35% by weight of water;
   4-8% by weight of organic solvent or solvent mixture;
   5-10% by weight of colored pigment(s);
   0.5-1% by weight of additive for stabilizing the pigment dispersion/emulsion;
   0.5-2% by weight of dispersing additive;
   0.5-3% by weight of inorganic filler or filler mixture; and
   35-60% by weight of polymer dispersion or polymer emulsion or polymer solution.

18. A method according to claim 16, wherein an acrylate polymer emulsion or an acrylate copolymer emulsion or an anionic acrylate copolymer emulsion is used as the polymer emulsion.

19. A method according to claim 16, wherein a polyurethane dispersion or a polyester resin dispersion or a vinyl acetate-ethylene copolymer dispersion is used as the polymer dispersion.

20. Use of a film according to claim 1 for coating motor vehicle number plates with formation of a character legend which contains alphanumeric characters.

21. Use of a film according to claim 1 for coating packagings, plastic parts for an interior of motor vehicles, pieces of furniture and valuable documents.

\* \* \* \* \*

UNITED STATES PATENT AND TRADEMARK OFFICE
CERTIFICATE OF CORRECTION

PATENT NO. : 8,314,990 B2
APPLICATION NO. : 12/462476
DATED : November 20, 2012
INVENTOR(S) : Suessner et al.

Page 1 of 1

It is certified that error appears in the above-identified patent and that said Letters Patent is hereby corrected as shown below:

TITLE PAGE

(73) Assignees:    now reads "Leonhard Kurz Stiftung & Co., Furth (DE)"

should read -- LEONHARD KURZ Stiftung & Co., KG, Furth (DE) --

IN THE SPECIFICATION

Column 5, line 45    now reads "formed. optically variable"

should read -- formed. Optically variable --

Column 10, line 7    now reads "difference An between"

should read -- difference $\Delta$n between --

Column 10, line 26    now reads "indices An of a"

should read -- indices $\Delta$n of a --

Column 10, line 31    now reads "contribution of An in the"

should read -- contribution of $\Delta$n in the --

Signed and Sealed this
Fifth Day of November, 2013

Teresa Stanek Rea
*Deputy Director of the United States Patent and Trademark Office*